United States Patent
Naipawer, III et al.

(10) Patent No.: US 6,863,944 B2
(45) Date of Patent: Mar. 8, 2005

(54) THERMOPLASTIC SINGLE PLY PROTECTIVE COVERING

(75) Inventors: Michael P. Naipawer, III, Bloomingdale, NJ (US); Anthony Ruffine, Morristown, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 0 days.

(21) Appl. No.: 10/351,921

(22) Filed: Jan. 27, 2003

(65) Prior Publication Data

US 2004/0146681 A1 Jul. 29, 2004

(51) Int. Cl.$^7$ ............................... B32B 7/12; C08L 47/00
(52) U.S. Cl. .................... 428/40.1; 428/40.3; 428/41.3; 428/41.5; 428/147; 428/354; 428/355; 428/356; 525/236; 525/237; 525/240; 525/258
(58) Field of Search ............................... 428/40.1, 40.3, 428/41.3, 41.5, 147, 354, 356, 355, 40, 1, 355 BL, 355 N, 258; 525/258, 236, 237, 240

(56) References Cited

U.S. PATENT DOCUMENTS

| | | | | | |
|---|---|---|---|---|---|
| 4,780,350 | A | * | 10/1988 | O'Connor | 428/109 |
| 4,897,293 | A | * | 1/1990 | Thessen | 428/40 |
| 5,242,727 | A | * | 9/1993 | Briddell et al. | 428/40.6 |
| 6,297,324 | B1 | * | 10/2001 | Briddell | 525/237 |
| 6,316,088 | B1 | * | 11/2001 | Ogawa et al. | 428/297.4 |

* cited by examiner

*Primary Examiner*—Nasser Ahmad
(74) *Attorney, Agent, or Firm*—William J. Davis; Marilyn J. Maue

(57) ABSTRACT

Improved single ply, water proof roof coverings having an extruded pressure sensitive rubber-based adhesive backing for attachment to a substrate such as the roof of a building or a transport vehicle, the adhesive comprising a thermoplastic rubber containing at least 25% butyl rubber in combination with polyisobutylene and low molecular weight polybutene.

10 Claims, No Drawings

THERMOPLASTIC SINGLE PLY PROTECTIVE COVERING

FIELD OF THE INVENTION

This invention pertains to single ply weather exposable coverings for roof decks and transport vehicles including cars, trucks, trains, ships and the like which covering is in the form of an elongated sheet having improved roof attachment comprising a pressure sensitive, rubber based adhesive coating on its non-exposable undersurface.

BACKGROUND OF THE INVENTION

Conventional single ply roof coverings or membranes, in use since 1970, have experienced several problems involving ease of installation, poor light reflectivity resulting in higher energy costs, shrinkage resulting in seam failure, time consuming attachment, replacement and repair procedures, low tolerance of cold temperatures causing cracking and loss of flexibility and lower adhesive resistance to chemical attack. Conventional roofing employing single ply sheets of ethylene/propylene/butadiene (EPDM) copolymers have experienced leakage and seam failure due to membrane shrinkage. The introduction of seam tapes replacing adhesives have partially ameliorated this condition; however, the application of tapes is time consuming and encounters difficulties in repair and replacement. Single ply polyvinyl chloride (PVC)/plasticizer sheeting is presently more widely used for roofing since it offers several advantages over EPDM. For example, although more expensive, it is available in white or lightly tinted membranes for better light reflectivity, thereby realizing significant savings in energy costs. Also PVC possesses high resistance to a wide variety of potentially destructive chemicals. Notwithstanding these advantages, installation of PVC sheeting is associated with costly and time consuming heat-welded seams to insure watertight reliability. Moreover, in a few cases, problems with plasticizer migration has resulted in system failure. Sheeting of ethylene/propylene copolymer (TPO) and other thermoplastic olefin polymers have several advantages over the above including markedly reduced shrinkage, high reflectivity, good weatherability and improved impact and puncture resistance, thereby addressing and minimizing the prior causes of single ply roofing failure.

Various methods of attachment of the above sheeting to roofs have been used or proposed. These include mechanical fastening with screws and anchor plates through the membrane and into a roof deck; the ballasting of the membrane with rocks or alternative aggregates to hold the membrane in place and coating of both the substrate and the membrane with a contact adhesive, containing aromatic components, which requires extended curing time for the coated surfaces to bond. Additionally, the later method presents health hazards arising from noxious toluene or xylene fumes vaporized during the curing process.

Accordingly, it is an object of the present invention to overcome the above time consuming procedures and other deficiencies while retaining beneficial properties of single ply roofing including superior tear, peel and puncture resistance, low temperature tolerance to avoid cracking and resistance to chemical attack.

Another object is to provide a single ply roof covering which eliminates mechanical fastening, ballasting, heat welding, cure time and supplementary adhesive requiring time curing.

Still another object is to achieve ease of replacement or patching of a surface adhered to a single ply roofing element.

Yet another object is to provide improved single ply sheeting packaged in a continuous roll which is immediately ready for use after peeling off a silicone release backer strip.

These and other objects and advantages will become apparent from the following description and disclosure.

SUMMARY OF THE INVENTION

In accordance with the present invention there is provided a sheet of a conventional reinforced or non-reinforced single ply roof covering or membrane, optionally having a layer of adhesive adsorbing material annealed to its undersurface, and having at least the undersurface edges of the membrane, or adhesive absorbing layer, coated with a pressure sensitive adhesive, comprising (a) a rubber based polymer, or blend of polymers, containing at least about 25% butyl rubber; (b) poly(isobutylene) and low molecular weight polybutene or mixtures of the foregoing components.

DETAILED DESCRIPTION OF THE INVENTION

The invention comprises a single ply roofing sheet which includes any of those discussed above or any other single ply membrane useful as a covering for a roof deck or a vehicle of transportation. Representative examples of suitable membranes are thermoplastic polyolefins such as TPO, PVC, EPDM and other thermoplastic olefin polymers.

The membrane may include a scrim embedded in the thermoplastic polymer for added strength, except where greater pliability is desired for detailed application, e.g. around joints or flashing. The scrim is generally composed of polyester or other fibrous or woven material, e.g. nylon, Orlon fibers and the like.

Additionally, the reinforced or non-reinforced membrane can have an adhesive adsorbent sheet annealed to its undersurface to provide a stronger bond between the adhesive and membrane layers. Suitable adhesive adsorbent sheets are composed of felt, fleece, or any other random or woven fibers of cellulosic or synthetic materials such as, for example, nylon or Orlon fibers.

The single ply sheet of the invention is attached to a roof substrate by means of a 1 to 50 mil undercoat layer, preferably a 3 to 30 mil undercoat layer, of a pressure sensitive, polymeric adhesive or an adhesive mixture which is coated on at least the outer margins of the undersurface edges of the thermoplastic membrane or adhesive adsorbent layer. Suitable pressure sensitive adhesives are those which bond without curing and include (a) pressure sensitive rubber-based thermoplastic polymers containing at least 25 wt. % butyl rubber blended with (b) poly(isobutylene) and (c) poly(butene) or mixtures of (a). Component (a) includes known thermoplastic rubbers such as SB, SBS, SIS, SEBS. The pressure sensitive adhesive mixture containing approximately equal amounts of butyl rubber, poly(isobutylene) having a number average molecular weight of from about 70,000 to about 400,000 and polybutene having a number average molecular weight of from about 700 to about 2,700 is preferred. Most desirable is a mixture containing between about 32–34 wt. % butyl rubber, e.g. EXXPRO, supplied by EXXON/MOBIL; between about 32–34 wt. % polyisobutylene, e.g. VISTONEX, also supplied by EXXON/MOBIL and between about 30–36 wt. % polybutene, e.g. INDOPOL, supplied by BP AMOCO. The adhesive mixture may additionally contain up to 3% of thinner or thickener depending on the weight of the membrane and climatic conditions associated with its use.

The adhesive may also contain small amounts, less than 5% antioxidant and/or a hydrocarbon or rubber tackifier, e.g. a $C_6$ to $C_{12}$ e.g. ESCOREVZ supplied by EXXON/MOBIL.

The thickness of the reinforced or non-reinforced single ply membrane, including any adhesive adsorbent layer, can vary between about 25 and about 60 mils, preferably between about 40 and about 50 mils. The overall thickness of the present pressure sensitive adhesive treated membrane is between about 45 and about 75 mils, most preferably between about 55 and about 65 mils.

The present membrane, when packaged as a continuous roll, is faced with craft paper or a silicone treated release sheet covering the adhesive surface which release material is easily peeled off before installation on the roof. Installation of instant membrane is greatly simplified since it requires no mechanical fastening, no adhesive cure time, no ballast and no extraneous adhesive chemicals. The sheet is simply cut to size, the release sheet peeled away and the membrane positioned on the roof for immediate installation and instant bonding of membrane to the substrate while heat sealing any seams in the membrane structure The present improved single ply membrane exhibits superior puncture resistance of more than 250 lbf (pounds force); a tear strength of 124×140 lbf or more and a peel strength greater than 45 lbs. In addition, the membrane has good chemical resistance, while retaining a degree of flexibility at low and freezing temperatures. Further, the pressure adhesive coating allows the membrane to conform to substrate irregularities and various roof areas such as roof hips and valleys.

Having generally described the invention, reference is had to the following examples which illustrate preferred embodiments and comparisons with current single ply membranes; however, these examples are not to be construed as limiting to the scope of the invention as defined by the appended claims.

EXAMPLE 1

Equal parts of polyisobutylene of average molecular weight 100,00; polybutene of average molecular weight about 1,000 and thermoplastic styrene/butadiene/styrene polymer containing 30 wt. % butyl rubber are extruded into a mixing kettle and stirred at 220° C. for 0.5 hour to provide a spreadable pressure sensitive adhesive. The adhesive is coated on the undersurface of a single ply polyvinyl chloride membrane in a thickness of about 50 mils to provide a single ply roof deck covering having resistance to wind lift without the need for mechanical fastening.

EXAMPLE 2

The above procedure is repeated except that the single ply membrane is fortified with a glass mat scrim embedded in the membrane. The resulting product exhibits good resistance to wind lift when applied to a roof deck.

EXAMPLE 3

Example 1 is again repeated except that the single ply membrane has an undersurface adhesive-absorbing layer of felt fibers to increase the amount of pressure sensitive adhesive taken up in the coating step by the membrane to provide an adhesive undercoating of 75 mils. This product also exhibits excellent resistance to wind lift when installed on a roof deck.

Without departing from the scope of this invention, it will be understood that other pressure sensitive adhesive components can be substituted in whole or in part for the composition (a), (b) and (c) or a portion of (a) alone but, depending on their concentration, such substitutions are subject to one or more of the foregoing disadvantages discussed in the Background of the Invention. Such pressure sensitive substitution adhesives include acrylic polymers and polyurethanes.

What is claimed is:

1. A single ply thermoplastic roofing membrane coated on its bottom surface with a 1–50 mil layer of a non-cured, non-curable, pressure sensitive adhesive mixture consisting essentially of (a) a thermoplastic rubber containing at least 25 wt. % butyl rubber;

(b) a polyisobutylene having a number average molecular weight of from about 70,000 to about 400,000 and (c) a polybutene having a number average molecular weight of from about 700 to about 2,700, wherein said mixture contains approximately equal portions of butyl rubber, (b) and (c) and optionally contains a minor amount of a thickener, thinner, and/or antioxidant.

2. The improvement of claim 1 wherein said adhesive contains between about 32 and about 34 wt. % butyl rubber based polymer, between about 32 and about 34 wt. % poly(isobutylene) and between about 30 and about 36 wt. % poly(butene).

3. The improvement of claim 1 wherein the single ply membrane is fortified with a scrim of random or woven fibers.

4. The improvement of claim 1 wherein the single ply membrane is non-fortified.

5. The improvement of claim 1 wherein the pressure sensitive adhesive mixture contains up to about 3 wt. % of a thickener or thinner.

6. The improvement of claim 1 wherein the pressure sensitive adhesive mixture contains up to about 5 wt. % of an antioxidant or rubber tackifier.

7. The improvement of claim 6 wherein the rubber based polymer is selected from the group consisting of a polymer of styrene/butadiene, styrene/butadiene/styrene, styrene/isoprene/styrene and styrene/ethylene/butadiene/styrene.

8. The improvement of one of claims 3 and 4 wherein an adhesive adsorbing layer is annealed to the undersurface of the single ply membrane between the membrane and the pressure sensitive adhesive coating.

9. The improvement of claim 1 wherein the free surface of the adhesive is covered with kraft paper or a silicone treated release sheet and packaged as a roll of ply material.

10. The improvement of claim 1 wherein a portion of the pressure sensitive adhesive (a), (b) and (c) or a portion of (a) alone is replaced with a pressure sensitive adhesive selected from the group consisting of an acrylate polymer and a polyurethane and a mixture thereof.

* * * * *